J. F. McCOY.
Tire-Upsetter.

No. 227,557.

Patented May 11, 1880.

WITNESSES:
Francis McArdle
C. Sedgwick

INVENTOR:
J. F. McCoy
BY Munn & Co
ATTORNEYS.

UNITED STATES PATENT OFFICE.

JOHN F. McCOY, OF BEVERLY, NEW JERSEY.

TIRE-UPSETTER.

SPECIFICATION forming part of Letters Patent No. 227,557, dated May 11, 1880.

Application filed February 18, 1880.

*To all whom it may concern:*

Be it known that I, JOHN F. McCOY, of Beverly, county of Burlington, State of New Jersey, have invented a new and useful Improvement in Tire-Upsetters, of which the following is a specification.

Figure 1:
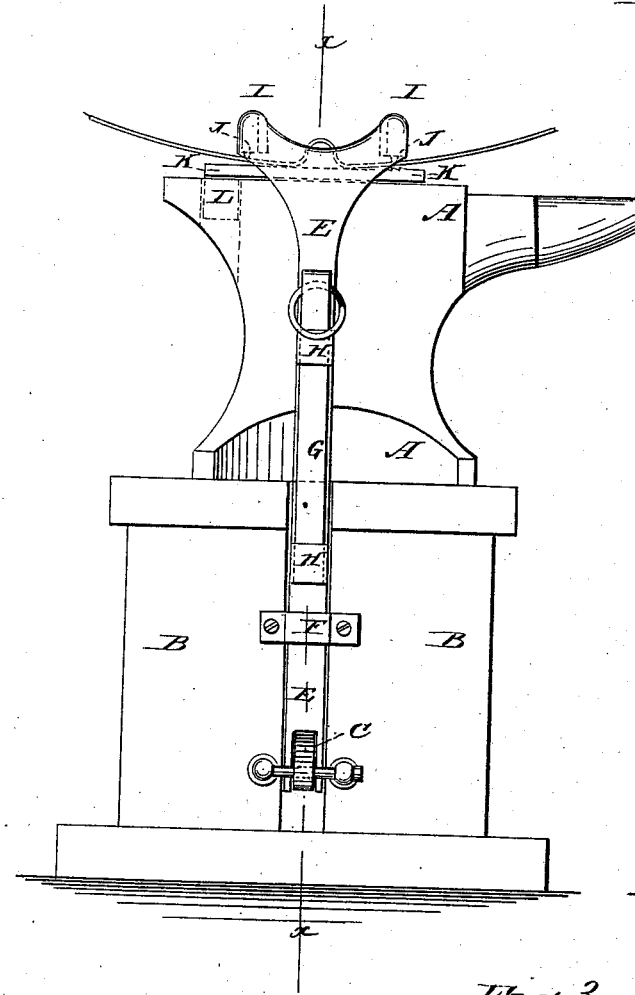
Figure 2:
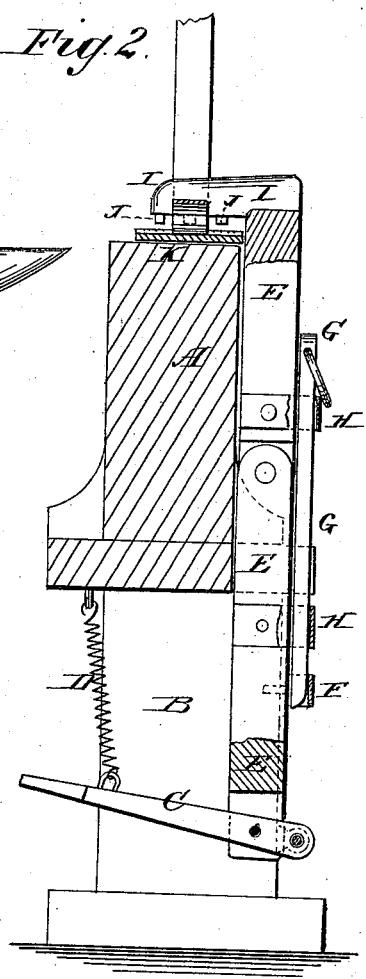
Figure 3:
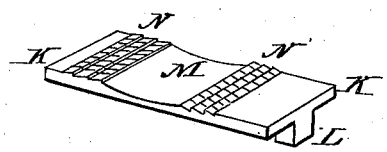

Figure 1 is a rear elevation of the improvement. Fig. 2 is a sectional elevation taken through the line *x x*, Fig. 1; and Fig. 3 is a perspective view of the toothed plate.

Similar letters of reference indicate corresponding parts.

The object of this invention is to furnish tire-upsetters so constructed that they may be used upon an anvil, and which shall be simple in construction and convenient and effective in use.

The invention consists in constructing a tire-upsetter of a treadle, a spring, a jointed standard carrying toothed arms upon its upper end, the bar and keepers for holding the standard erect, and the concaved and toothed plate for preventing the tire from slipping, all combined and operating as will be hereinafter fully described.

A represents the anvil. B is the anvil-block, which is made in two parts, or has a slot or opening formed through it to receive a treadle, C.

The treadle C is held up by a coiled spring, D, attached to it and to the base of the anvil A or the upper part of the block B. The rear end of the treadle C is pivoted to the rear side of the block B, and to it, near its rear end, is pivoted the lower end of the standard E, which passes up through a strap, F, attached to the rear side of the block B, to keep it in an erect position.

The standard E is jointed, so that its upper part can be turned back out of the way when not required for use.

The standard E is held erect when in use by a bar, G, placed upon its rear side and inserted in keepers H, attached to the standard E above and below its joint, so that the said bar G can be readily withdrawn to allow the standard E to be turned back out of the way.

Upon the upper end of the standard E are formed two forwardly-projecting arms, I, I, which extend over the anvil A and have teeth or points J upon their lower sides to take hold of the tire and hold it while being upset.

Upon the top of the anvil A is laid a plate, K, which has a square projection, L, formed upon its lower side at one end to fit into a hole in the anvil A, to keep the said plate K in place.

The middle part, M, of the face of the plate K is concave to give the proper shape to the upset part of the tire.

The end parts of the face of the plate K have inwardly-projecting teeth N formed upon them to take hold of the tire and hold it from slipping while being upset.

In using the upsetter the tire is heated and has an inwardly-projecting bend or loop formed in it over the horn of the anvil. The looped part of the tire is then placed between the arms I, the tire upon both sides of the said loop is clamped between the arms I and the loop-plate K, and the loop in the tire is hammered out, shortening the tire more or less, according as a greater or less loop may have been formed in it.

Having thus described my invention, I claim as new and desire to secure by Letters Patent—

The combination, with the anvil A, two-part block B, and spring-treadle C, of the pivoted standard E, having toothed arms I I, and jointed near the top, the bar G in keepers, and the toothed plate K, having projection L and concave M, as and for the purpose specified.

JOHN F. McCOY.

Witnesses:
PETER POWELL,
NELSON FISH.